Patented Feb. 20, 1945

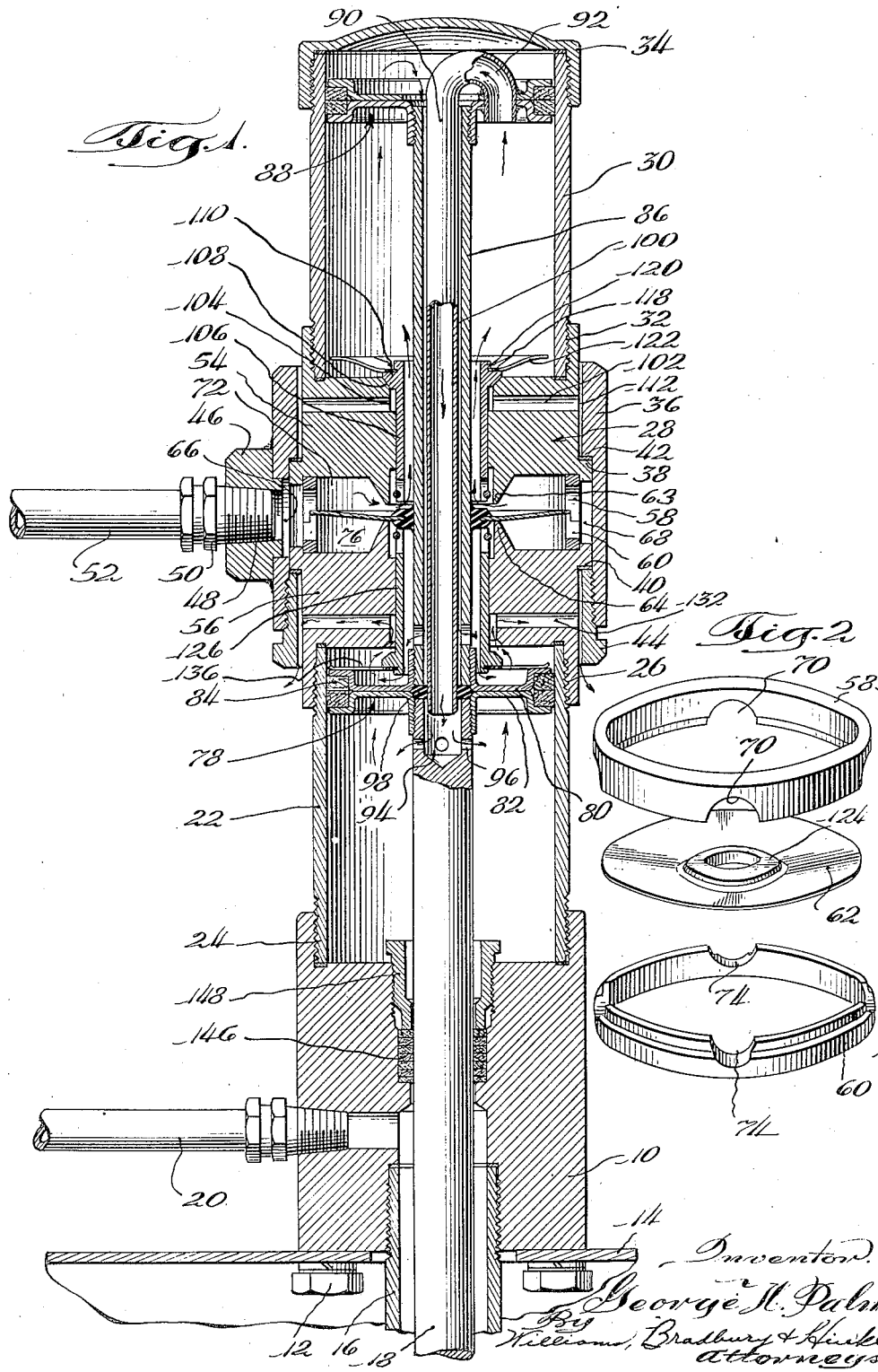

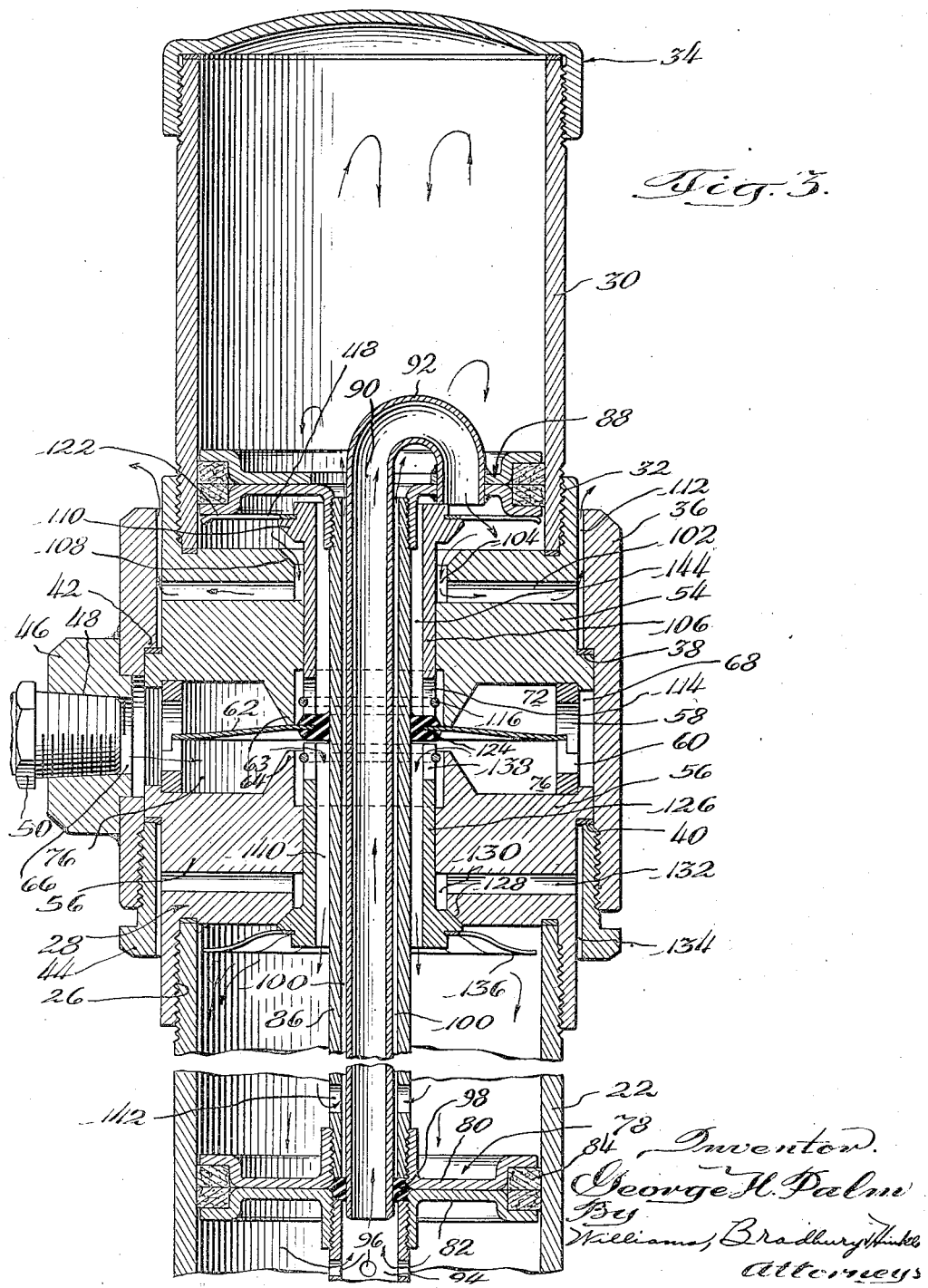

2,370,068

UNITED STATES PATENT OFFICE 2,370,068

AIR MOTOR FOR LUBRICATING PUMPS

George H. Palm, Chicago, Ill., assignor to Stewart-Warner Corporation, Chicago, Ill., a corporation of Virginia Application November 1, 1943, Serial No. 508,516

16 Claims. (Cl. 121—164)

My invention relates to air motors for lubricating pumps and is more particularly concerned with, but not limited to, an air motor adapted for use on a portable lubricating pump which can be manually applied to and removed from the top of a lubricant drum in which lubricant is shipped from the refinery.

In automotive lubricating practice it is common for service stations and garages to utilize lubricating pumps which can be applied directly to the lubricant drums in which lubricant is shipped from the lubricant refinery. Such pumps extend down into the lubricant drum and discharge the lubricant through a discharge hose usually provided with a control valve having a coupler for coupling directly to the lubricant fittings or nipples attached to the chassis bearings of the automotive vehicle. Such lubricant pumps are commonly operated either by electricity or compressed air.

An object of my invention is to provide a new and improved air motor particularly adapted for operating such a lubricant pump.

Another object of my invention is to provide an air motor for lubricating pumps and wherein new and improved means is provided for controlling the flow of air to reverse the direction of pump movement.

Another object of my invention is to provide an air motor for lubricating pumps having new and improved air control valve mechanism.

Another object of my invention is to provide a new and improved air motor which is simple and inexpensive to manufacture and durable and reliable in service.

Another object of my invention is to provide a new and improved air motor which requires a minimum number of castings and which can be made largely of metal tubing or parts formed by stamping operations.

Other objects and advantages will become apparent as the description proceeds.

In the drawings:

Figure 1 is a vertical sectional view through an air motor embodying a preferred form of my invention;

Figure 2 is an exploded view showing the several parts of the air control valve in separated relation; and Figure 3 is an enlarged view of the upper part of Figure 1 but showing the parts in a different position.

The embodiment of my invention which I have illustrated in the drawings comprises a lower casting 10 secured by bolts 12, or in any other suitable manner, to a cover 14 which may be applied directly over the upper end of a lubricant drum after the small closure in the upper end of the drum as it comes from the refinery has first been removed. A tubular portion 16 of the lubricant pump housing depends into the interior of the drum and supports any conventional pumping mechanism which is operated by a driving rod 18. The lubricant discharged by the pumping mechanism flows upwardly between the tube 16 and rod 18 and is delivered to a discharge conduit 20 which is preferably of the flexible type and which may be provided with any suitable control valve and coupler, in accordance with usual practice.

An air cylinder 22 preferably formed from a section of metal pipe is threaded to the upper end of the casting 10, as indicated at 24. The upper end of the cylinder 22 is threaded at 26 to a body 28 containing the control valve mechanism for regulating the admission and discharge of the operating air. A second air cylinder 30 is threaded at 32 to the upper body 28 and is closed at the opposite end by a cap 34. The cylinders 22 and 30 may be identical and formed by the same process from the same piece of tubing or metal pipe. The cover 34 may be formed as a stamping of sheet metal threaded by any usual or desirable means.

The body 28 is surrounded by a metal sleeve 36 which may be formed by a casting process or may be machined from a piece of metal pipe or tubing. The body 28 has a pair of opposed shoulders 38 and 40, one of which is engaged by a shoulder 42 of the sleeve 36. The shoulder 40 of the body 28 is engaged by a tubular nut 44 which is threaded into the lower end of the sleeve 36. The sleeve 36 has a boss 46 welded or otherwise secured thereto. This boss is internally threaded as indicated at 48 to receive the nipple 50 of an air supply hose 52 which connects the air motor with a pressure tank or any other suitable source of supply for air under pressure. The body 28 is composed of a pair of identical castings 54 and 56 which provide the shoulders 38 and 40 and are held together by sleeve 36 and nut 44. The castings 54 and 56 are held in spaced relation to each other by upper and lower rings 58 and 60 which are shown more clearly in Figure 2. A flexible annular valve member 62 is clamped between the rings 58 and 60 and is adapted alternately to engage annular valve seats 63 and 64 provided by the castings 54 and 56, respectively.

The sleeve 36 is provided with an inlet opening 66 communicating with the air supply pipe 52 and connecting this pipe with an annular space 68 formed between the sleeve 36 and the rings 58 and 60. The ring 58 has semi-circular openings 70 which connect the annular space 68 with a chamber 72 located between the valve member 62 and the casting 54. The ring 60 is also provided with semi-circular openings 74 which connect the annular space 68 with a chamber 76 located between the valve member 62 and the casting 56.

The upper end of the driving rod 18 is threaded into a piston 78 located in the cylinder 22. This piston is formed of a pair of sheet metal stampings 80 and 82 which may be spot welded or otherwise secured to each other. A pair of piston rings 84 is confined between the outer edges of the stampings 80 and 82 and engages the cylinder wall to prevent leakage past the piston. A tubular piston rod 86 is secured to the piston 78 at its lower end and is secured at its upper end to a second piston 88 operating in the upper cylinder 30. This upper piston may be formed in the same manner as the lower piston. A tube 90 extends through the hollow piston rod 86 in spaced relation thereto and has a bent-over upper end 92 passing outwardly through the piston 88 and opening into cylinder 30 below the piston. The lower end of the tube 90 extends into a bore 94 formed in the upper end of the driving rod 18. This bore communicates with the interior of the cylinder 22 below the piston 78 through transverse bores 96. A sealing ring 98 is clamped between the upper end of the driving rod 18 and the lower end of the piston rod 86 and seals against the lower end of the tube 90 to close the annular passage 100 formed between the tube 90 and the piston rod 86. The casting 54 has radial bores 102 communicating with an annular chamber 104 surrounding a sleeve 106 slidable in a central bore in the casting 54. The upper end of this casting has a valve seat 108 engageable by an annular valve part 110 formed on the upper end of this sleeve. This valve part controls communication between the lower end of the cylinder 30, annular chamber 104, bores 102 and an annular discharge passage 112 formed between the upper end of cylinder 36 and the casting 54.

The lower end of the slidable sleeve 106 is notched, as indicated at 114, and a spring ring 116 limits upward movement of the sleeve 106. An annular resilient plate 118 is secured to the upper end of the sleeve 106 and is held in place by a spun over portion 120. The plate 118 is provided with radial slots which divide this plate into a plurality of spring fingers 122 adapted to be engaged by pistons 88, as shown in Figure 3. In Figure 3, this piston is shown just prior to the completion of its downward stroke. The remaining downward stroke of this piston will shift sleeve 106 from the position shown in Figure 3 to that shown in Figure 1. This will cause valve part 110 on the upper end of the sleeve 106 to engage its seat 108 and close the exhaust outlet for the lower end of the cylinder 30. At the same time the notched lower end of the sleeve 106 will engage the neoprene ring 124, affixed to the center of the annular valve member 62, and move the center portion of this valve member downwardly from the position shown in Figure 3 to that shown in Figure 1.

A second sleeve 126 is slidable in the casting 56 and controls exhaust of air from the upper end of the lower cylinder 22, by way of exhaust valve 128, annular chamber 130, radial passages 132 and annular passage 134. The sleeve 126 is identical with the sleeve 106 and has resilient fingers 136 adapted to be engaged by the piston 78 as the latter approaches the upper end of its stroke. The opposite end of the sleeve 126 is notched, as indicated at 138, and is adapted to engage the rubber ring 124 to shift the central portion of the main valve member 62. This ring 124 slidably engages the exterior wall of the piston rod 86 and forms a seal therewith.

When the pump is in operation and the parts are in the position shown in Figure 3, the air pistons 78 and 88 would be approaching the limit of their downward strokes. In position of the parts shown in Figure 3, air under pressure is supplied to the annular chamber 76 between the main valve member 62 and the lower casting 56, and passes through the slots in the upper end of sleeve 126 into the space 140 between this sleeve and the piston rod 86. This air under pressure flows downwardly through the space 140 into the upper end of the lower cylinder 22 and acts upon the upper side of the piston 78 therein to urge this piston downwardly. This air under pressure also passes through the openings 142 in the piston rod 86 and flows upwardly through the annular passage 100 to that part of the upper cylinder 30 above the upper piston 88 so that the air under pressure also acts on the upper side of this piston to urge it downwardly.

As the pistons 78 and 88 complete their downward stroke, sleeve 106 is moved downwardly to engage valve part 110 with valve seat 108 and thereby close the exhaust outlet for the lower end of the cylinder 30. This downward movement of the sleeve 106 also shifts the central portion of the main valve member from engagement with its upper valve seat 62 into engagement with its lower valve seat 64, as shown in Figure 1. At the same time the lower sleeve 126 is moved downwardly to open the exhaust valve 128 for the upper end of the lower cylinder 22. In this position of the parts, air under pressure flows upwardly into the lower end of the upper cylinder 30 through annular passage 144 formed between sleeve 106 and piston rod 86. That part of the upper cylinder beneath the piston 88 communicates through tube 90 with that part of the lower cylinder beneath its piston 78, so that air under pressure acts on the lower sides of pistons 78 and 88 to urge them upwardly. Air from that part of the lower cylinder above its piston 78 escapes to atmosphere by way of valve 128, chamber 130, bores 132 and annular passage 134. Air from that part of the upper cylinder above the upper piston 88 also escapes through exhaust valve 128, since this portion of the upper cylinder is in communication with the upper portion of the lower cylinder by way of passage 100 and openings 142 in the piston rod 86.

Reciprocation of the pistons 78 and 88 and piston rod 86 results in corresponding reciprocation of the driving rod 18 which in turn operates the pump mechanism located in the lubricant drum. Where this driving rod passes through the lower casting 10, packing 146 is provided to prevent escape of air from the lower end of the cylinder 22 and escape of lubricant from the discharge conduit into this cylinder. This packing is held in place by a tubular nut 148 screwed into the casting 10, as clearly shown in Figure 1. The casting 10 is attached to a cover 14, as previously described, and the entire assembly is made as compact and light in weight as possible in order to facilitate the manual application of this assembly to a lubricant drum and the manual removal of such assembly therefrom after the lubricant in the drum has become exhausted.

Particular attention is directed to the simplicity, reliability and durability of the main valve structure for directing the compressed air to opposite ends of the motor cylinders. This valve mechanism has a single operating member comprising a flexible metal annulus provided with a ring of neoprene or other suitable material for effecting a seal with the piston rod. The metal of the flexible member directly contacts the opposed valve seats so that the only wear on the rubber ring is occasioned by the relative sliding motion between this ring and the piston rod. The force exerted by the compressed air serves to urge the valve member 92 against its seats and the force pressing this valve member against one of its seats is always proportional to the then existing air pressure.

The other parts of my new and improved air motor are of simple and rugged construction and can readily be manufactured cheaply and with the aid of existing machinery of conventional types. While I have described my novel motor as being particularly adapted for use as an integral part of a portable lubricating pump, my motor is not limited to such use but is capable of general application.

While I have illustrated and described only a single embodiment of my invention, my invention is not limited to the particular details shown and described in this application but may assume numerous other forms and my invention includes all modifications, variations and equivalents coming within the following claims.

I claim:

1. An air motor of the class described, comprising a pair of cylinders, a body located between said cylinders, said body providing a chamber having a pair of opposed annular valve seats, means for supplying air under pressure to said chamber, passages connecting said chamber with said cylinders, an annular valve having one edge clamped in said body, pistons in said cylinders, and means operated by said pistons for shifting the other edge of said valve alternately to engage said valve seats to regulate air flow to said cylinders.

2. An air motor of the class described, comprising a pair of castings providing an annular chamber therebetween, each of said castings providing an annular valve seat, rings interposed between said castings and holding said castings in spaced relation, a flexible annular valve member having its outer edge clamped between said rings, means for supplying fluid under pressure to the space between said castings, a cylinder attached to each casting, a piston in each cylinder, a tubular rod connecting said pistons, sealing means carried by the inner edge of said valve member and engaging said rod, a sleeve slidable in each casting, said sleeves controlling engagement between said valve member and said seats, and exhaust means for said cylinders controlled by said sleeves.

3. An air motor of the class described, comprising a pair of cylinders, a body located between said cylinders, said body providing a pair of opposed annular valve seats, means for supplying air under pressure to said body, passages connecting said valve seats with said cylinders, an annular valve having one edge clamped in said body, pistons in said cylinders, means operated by said pistons for shifting the other edge of said valve alternately to engage said valve seats, and exhaust valves for said cylinders.

4. An air motor of the class described, comprising a pair of members providing an annular chamber therebetween, each of said members providing an annular valve seat, means interposed between said members and holding said members in spaced relation, a flexible annular valve member having its outer edge secured by said means, means for supplying fluid under pressure to the space between said members, a cylinder attached to each member, a piston in each cylinder, a tubular rod connecting said pistons, sealing means carried by the inner edge of said valve member and engaging said rod, a sleeve slidable in each casting, said sleeves controlling engagement between said valve member and said seats, and exhaust means for said cylinders controlled by said sleeves.

5. An air motor of the class described, comprising a pair of cylinders, a body located between said cylinders, said body providing a pair of opposed annular valve seats, means for supplying air under pressure to said body, passages connecting said valve seats with said cylinders, a flexible annular valve having one edge clamped in said body, pistons in said cylinders, sleeves operated by said pistons for shifting the other edge of said valve alternately to engage said valve seats, and exhaust valves controlled by said sleeves.

6. An air motor of the class described, comprising a pair of castings providing an annular chamber therebetween, each of said castings providing an annular valve seat, a ring interposed between said castings and holding said castings in spaced relation, a flexible annular valve member having its outer edge secured to said ring, means for supplying fluid under pressure to the space between said castings, a cylinder attached to each casting, a piston in each cylinder, a rod connecting said pistons, a rubber ring carried by the inner edge of said valve member and engaging said rod, means slidable in said castings and controlling engagement between said valve member and said seats, and exhaust means for said cylinders controlled by said means.

7. An air motor of the class described, comprising a plurality of cylinders, a body located between said cylinders, said body providing opposed annular valve seats, means for supplying air under pressure to said body, passages connecting said valve seats with said cylinders, an annular valve having an outer edge clamped in said body, pistons in said cylinders, and means operated by said pistons for shifting the inner edge of said valve alternately to engage said valve seats.

8. An air motor of the class described, comprising a pair of castings providing an annular chamber therebetween, each of said castings providing an annular valve seat, rings interposed between said castings and holding said castings in spaced relation, a flexible annular valve member having its outer edge clamped between said rings, means for supplying fluid under pressure to the space between said castings, a cylinder attached to each casting, a piston in each cylinder, a tubular rod connecting said pistons, sealing means carried by the inner edge of said valve member and engaging said rod, a tube connecting said cylinders, a sleeve slidable in each casting, said sleeves controlling engagement between said valve member and said seats, and exhaust means for said cylinders controlled by said sleeves.

9. An air motor of the class described, comprising a pair of cylinders, a body located between said cylinders, said body providing a pair of opposed annular valve seats, means for supplying air under pressure to said body, passages connecting said valve seats with said cylinders, an annular valve having one edge clamped in said body, pistons in said cylinders, means operated by said pistons for shifting the other edge of said valve alternately to engage said valve seats, a pair of tubes connecting said cylinders, and exhaust means for said cylinders.

10. An air motor of the class described, comprising a pair of castings providing an annular chamber therebetween, each of said castings providing an annular valve seat, rings interposed between said castings and holding said castings in spaced relation, a flexible annular valve member having its outer edge clamped between said rings, means for supplying fluid under pressure to the space between said castings, a cylinder attached to each casting, a piston in each cylinder, a tubular rod connecting said pistons, sealing means carried by the inner edge of said valve member and engaging said rod, a tube located in said rod and connecting said cylinders, a sleeve slidable in each casting, said sleeves controlling engagement between said valve member and said seats, and exhaust means for said cylinders controlled by said sleeves.

11. An air motor of the class described, comprising a pair of cylinders, a body located between said cylinders, said body providing a pair of opposed annular valve seats, means for supplying air under pressure to said body, passages connecting said valve seats with said cylinders, an annular valve having one edge clamped in said body, pistons in said cylinders, and means operated by said pistons for shifting the other edge of said valve alternately to engage said valve seats, a pair of telescoped tubes connecting said cylinders, and exhaust valves for said cylinders.

12. An air motor of the class described, comprising a pair of annular castings providing an annular chamber therebetween, each of said castings providing an annular valve seat, means interposed between said castings and holding said castings in spaced relation, a flexible annular valve member having its outer edge clamped to said means, means for supplying fluid under pressure to the space between said castings, a cylinder attached to each casting, a piston in each cylinder, a pair of telescoped tubes connecting said pistons, sealing means carried by the inner edge of said valve member and engaging one of said tubes, a sleeve slidable in each casting, said sleeves controlling engagement between said valve member and said seats, and exhaust means for said cylinders controlled by said sleeves.

13. An air motor of the class described, comprising a pair of cylinders, a body located between said cylinders, said body providing a pair of opposed annular valve seats, means for supplying air under pressure to said body, passages connecting said valve seats with said cylinders, an annular valve having one edge clamped in said body, pistons in said cylinders, a rod connecting said pistons and sealed to said valve, and means operated by said pistons for shifting the other edge of said valve alternately to engage said valve seats.

14. An air motor of the class described, comprising a pair of castings providing an annular chamber therebetween, each of said castings providing an annular valve seat, rings interposed between said castings and holding said castings in spaced relation, a flexible annular valve member having its outer edge clamped between said rings, means for supplying fluid under pressure to the space between said castings, a cylinder attached to each casting, a piston in each cylinder, a tubular rod connecting said pistons, sealing means carried by the inner edge of said valve member and engaging said rod, and exhaust means for said cylinders controlled by said pistons.

15. An air motor of the class described, comprising a pair of cylinders, a body located between said cylinders, said body providing a pair of opposed annular valve seats, means for supplying air under pressure to said body, passages connecting said valve seats with said cylinders, an annular valve having one edge clamped in said body, pistons in said cylinders, sleeves operated by said pistons for shifting the other edge of said valve alternately to engage said valve seats, resilient piston-engaging means carried by said sleeves, and exhaust means for said cylinders.

16. An air motor of the class described, comprising a pair of castings providing an annular chamber therebetween, each of said castings providing an annular valve seat, rings interposed between said castings and holding said castings in spaced relation, a flexible annular valve member having its outer edge clamped between said rings, means for supplying fluid under pressure to the space between said castings, a cylinder attached to each casting, a piston in each cylinder, a tubular rod connecting said pistons, sealing means carried by the inner edge of said valve member and engaging said rod, a sleeve slidable in each casting, said sleeves being resiliently operated by said pistons and controlling engagement between said valve member and said seats, and exhaust valves for said cylinders controlled by said sleeves.

GEORGE H. PALM.